United States Patent [19]
Okitsu

[11] Patent Number: 5,798,804
[45] Date of Patent: Aug. 25, 1998

[54] IMAGE DECODER FOR DECODING VARIABLE-LENGTH IMAGE DATA USING FRAME SYNCHRONIZING SIGNAL AND METHOD OF DECODING THE IMAGE DATA

[75] Inventor: Hiromi Okitsu, Hamamatsu, Japan

[73] Assignee: Yamaha Corporation, Hamamatsu, Japan

[21] Appl. No.: 596,503

[22] Filed: Feb. 5, 1996

[30] Foreign Application Priority Data

Feb. 9, 1995 [JP] Japan .................. HEI. 7-044928

[51] Int. Cl.⁶ .................. H04N 7/64; H04N 7/26
[52] U.S. Cl. .................. 348/845.3; 348/518
[58] Field of Search .................. 348/518, 845.3, 348/426, 432, 715, 607, 714, 717, 718, 495; 375/362, 371, 372; 370/516, 517

[56] References Cited

U.S. PATENT DOCUMENTS

| | | | |
|---|---|---|---|
| 4,856,030 | 8/1989 | Batzer et al. | 375/106 |
| 5,321,725 | 6/1994 | Paik et al. | 375/39 |
| 5,371,547 | 12/1994 | Siracusa et al. | 348/426 |
| 5,452,006 | 9/1995 | Auld | 348/845.3 |
| 5,453,799 | 9/1995 | Yang et al. | 348/699 |
| 5,467,137 | 11/1995 | Zdepski | 348/845.3 |
| 5,473,385 | 12/1995 | Leske | 348/845.3 |
| 5,490,258 | 2/1996 | Fenner | 395/401 |
| 5,533,021 | 7/1996 | Branstad | 348/518 |

*Primary Examiner*—Victor R. Kostak
*Attorney, Agent, or Firm*—Pillsbury Madison & Sutro LLP

[57] ABSTRACT

In an image decoder of MPEG system or the like, a delay buffer which is able to store data which corresponds to at least one frame is provided in the rear stage of an input buffer which is normally provided, and a frame synchronizing pulse is applied to determine the timing of display independently of that which is determined by the bit stream. In synchronization with the frame synchronizing pulse which occurs for the first time after the passage of a delay period set for every frame in each of the bit streams, that frame is displayed. The input bit streams coming in during the period of time which elapses from the passage of the delay period until the occurrence of the frame synchronizing pulse, are absorbed by the delay buffer.

15 Claims, 5 Drawing Sheets

IMAGE DECODER FOR DECODING VARIABLE-LENGTH IMAGE DATA USING FRAME SYNCHRONIZING SIGNAL AND METHOD OF DECODING THE IMAGE DATA

BACKGROUND OF THE INVENTION

1. Field of the Invention

The present invention relates to an image decoder which is adapted to decode image data which is made up of compressed variable-length codes such as in MPEG (Moving Picture Coding Experts Group).

2. Related Art

Owing to an improvement of digital communications networks or data memory media, a variety of digital image compression systems (such as H.261, MPEG1 and MPEG2) have been proposed, and standardized.

In those streams, for instance in MPEG1, a coded bit stream consists of six layers—a sequence layer, GOP (Group of Pictures), picture layer, slice layer, macro-block layer and block layer. FIG. 4 shows two of those layers, namely, the sequence layer and the GOP layer. In the case of MPEG2, the coded bit stream has a layer structure which is substantially the same as the aforementioned one in MPEG1, however, the GOP layer is optional and the picture layer is not particularly specified in arrangement. In the case of a particular picture according to MPEG, data on an image is coded according to data on the images which are located before and after that image. That is, the use of only one image is not adequate for provision of sufficient data. Hence, with a group of pictures (GOP) including several screens as reference, random access is made.

The term "GOP" as used herein is a combination of three different types of pictures, i.e., I (Intra), P (Predictive) and B (Bidirectionally predictive) pictures. Each picture corresponds to one frame of image data, that is, I (intra) picture corresponds to an in-frame coded image, P (predictive) picture does to an inter-frame forwardly predictive coded image, and B (Bidirectionally predictive) picture does to an inter-frame bidirectionally predictive coded image. Each picture includes header portions such as a picture start code (PSC) portion, temporary reference (TR) portion, picture coding type (PCT) portion and VBV delay (VD) portion, and frame data. In the above-described case, the image data is handled for every field. In the case of MPEG2, however, the image data may be handled for every field.

An MPEG bit stream is of variable length code. Hence, in decoding the bit stream, the amount of data of each frame is not constant. For instance, the I picture formed by in-frame coding is much larger in the amount of codes per frame than the P or B picture formed by inter-frame coding on the basis of motion vector compensation. Even in the case of pictures of the same type, the amount of codes per frame depends on the speed in motion of the image, or the monotonousness in the arrangement of the latter.

Hence, in the case where an MPEG bit stream is transmitted over a constant-rate data transmission line such as a communication circuit, as shown in FIG. 5, a rate adjusting input buffer 1 is provided before a decoder body 2. An input bit stream (BS) is written in the input buffer 1 at a predetermined rate, and picture data corresponding to a frame is read out of it into the decoder body 2 at predetermined time intervals corresponding to the frame period.

This will be described in more detail with reference to FIG. 6. That is, in the initial state that the input buffer 1 is cleared, first the input bit stream BS passing through the input buffer 1 is decoded by a VLC (Variable Length Code) decoder. After the decoding of the picture (1) of the first frame, the picture (2) of the next frame is stored in the input buffer 1. With the timing of display of the first picture (i.e., the picture (1)) which is specified separately, decoding the next frame picture (2) is started. That is, the input bit frame BDS is inputted continuously at a constant rate, and therefore the input bit stream is stored in the input buffer 1 until the occurrence of the next picture display timing. On the other hand, for the purpose of inter-frame decoding, sometimes the frame display timing may occur several frames before the decode timing. However, for simplification in description, it is assumed that the decode timing is shifted as much as one frame from the display timing.

The display timing of each picture is determined by the VBV delay recorded in its header. That is, this value corresponds to the delay time period which elapses from the detection of picture start code PSC until the picture display timing.

In the above-described image decoder, the display timing of each image frame is determined according to the data (VBV delay VD) which is included in the bit stream BS for determination of the display timing. Therefore, as shown in FIG. 7 for instance, in the case where several channels of bit streams BSa, BSb and BSc are, in real time, switched and indicated which are transmitted through ISDN lines, those bit streams BSa, BSb and BSc are not always coincident with one another in indication timing. For instance, when in the frame displaying the picture (3) in FIG. 8, the bit stream BSa is switched over to the bit stream BSb, then up to the picture (4) which has been decoded is displayed as a video output Vo. However, since the period of time T from the start of the next frame to the start of displaying the picture (1') which is switched, is determined by the delay data VD of the bit stream BSb, it is not N times the frame period so that an undesirable asynchronous problem occurs. That means that, in the case where the display images are frequently changed, as in a television conference, for instance, the images displayed are irregular.

SUMMARY OF THE INVENTION

In view of the foregoing problems accompanying the conventional image decoder, an object of the invention is to provide an image decoder with which the images displayed are not irregular even when the channel is changed.

The foregoing object of the invention can be achieved by a provision of an image decoder which, according to the present invention, includes decoding device for decoding a variable-length frame input bit stream including image data, and an input buffer provided in the input stage of the decoding device, for adjusting the timing of supplying the input bit stream to the decoding device, wherein a delay buffer which is able to store an input bit stream which corresponds in time to at least one frame is interposed between the input buffer and the decoding device, and in the decoding device, after the passage of a delay time set for the input bit stream for every frame, the timing of display of image data decoded is determined by a predetermined frame synchronizing pulse.

In the image decoder of the invention, the delay buffer is arranged in the rear stage of the input buffer, which is able to store data corresponding to at least one frame, and a frame synchronizing pulse is applied which determines the display timing independently of the timing which is determined by the bit stream. In synchronization with the frame synchronizing pulse which occurs for the first time after the passage of a delay period set for every frame of the bit streams, that frame is displayed. The input bit streams coming in during the period of time which elapses from the end of the delay period until the occurrence of the frame synchronizing pulse, are absorbed by the delay buffer. Therefore, even when plural channels of bit streams different in display timing are switched over to one another, the display timing of all the frames is synchronous with the aforementioned frame synchronizing pulse. Thus, the image decoder, unlike the conventional one, is free from the difficulty attributing to the asynchronous problem.

DESCRIPTION OF THE PREFERRED EMBODIMENTS

A preferred embodiment of the invention will now be described with reference to the accompanying drawings.

Figure 1:
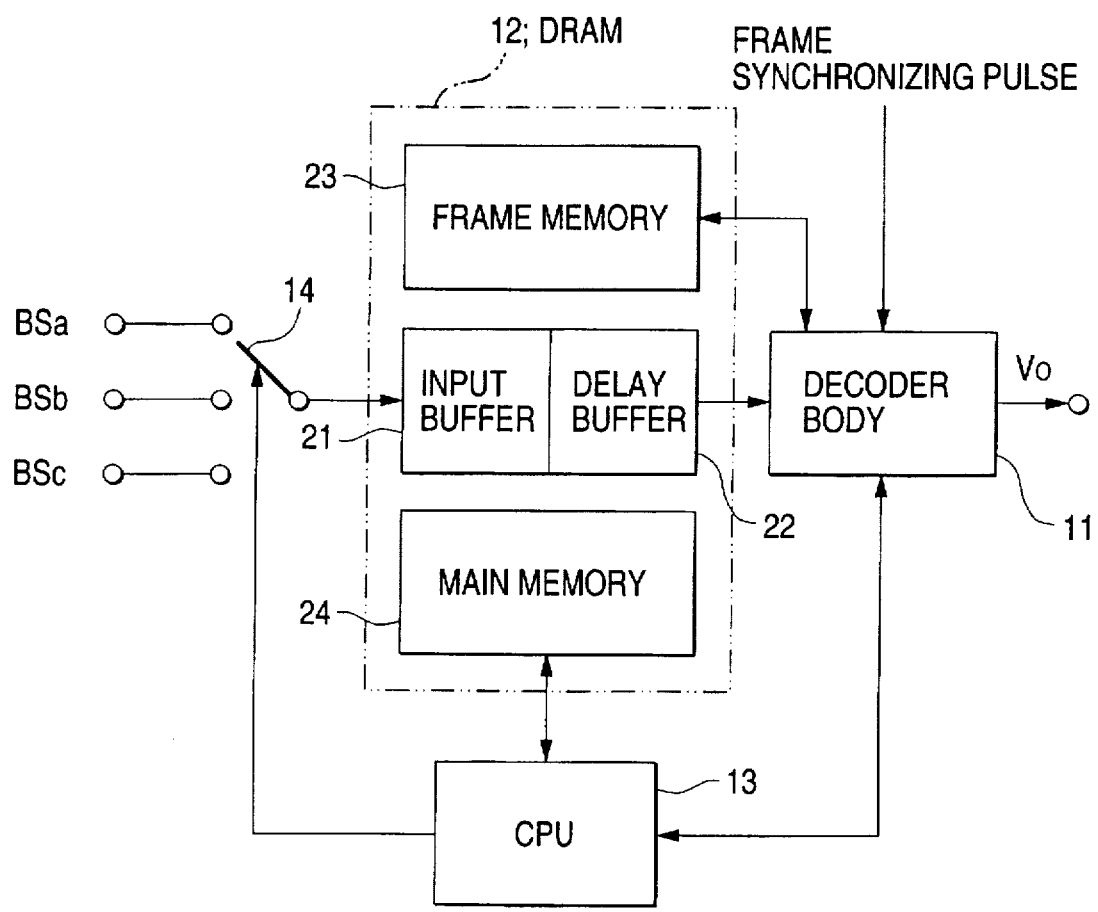
FIG. 1 is a block diagram of an image decoder, which constitutes an embodiment of the invention.

FIG. 1 is a block diagram showing an image decoder for MPEG 1 and MPEG 2, which constitutes the embodiment of the invention.

The image decoder comprises a decoder body 11, a DRAM 12 and a CPU 13. In the decoder body 11, an input bit stream is subjected to a variety of treatments such as VLC decoding, reverse quantization, reverse DCT (Discrete cosine transform), and halfpel motion compensation, thereby to decode the image frame. To the decoder body 11, a frame synchronizing pulse is externally applied to determine the timing of display of the image frame thus decoded. The DRAM 12 provides memory regions which are to form an input buffer 21 having a capacity of one frame which stores a bit stream during the period of time from reception of a bit stream to supply of it to the decoder body 11, a timing adjusting delay buffer 22 having a capacity of one frame which is set behind the input buffer 21, a frame memory 23 for storing front and before frames' image data for motion compensation, and main memory 24 for the operation of the CPU 13.

Bit streams BSa, BSb and BSc received through lines such as ISDN lines, are stored in the input buffer 21 and the delay buffer 22 being switched by a switch 14 under the control of the CPU 13.

Figure 2:
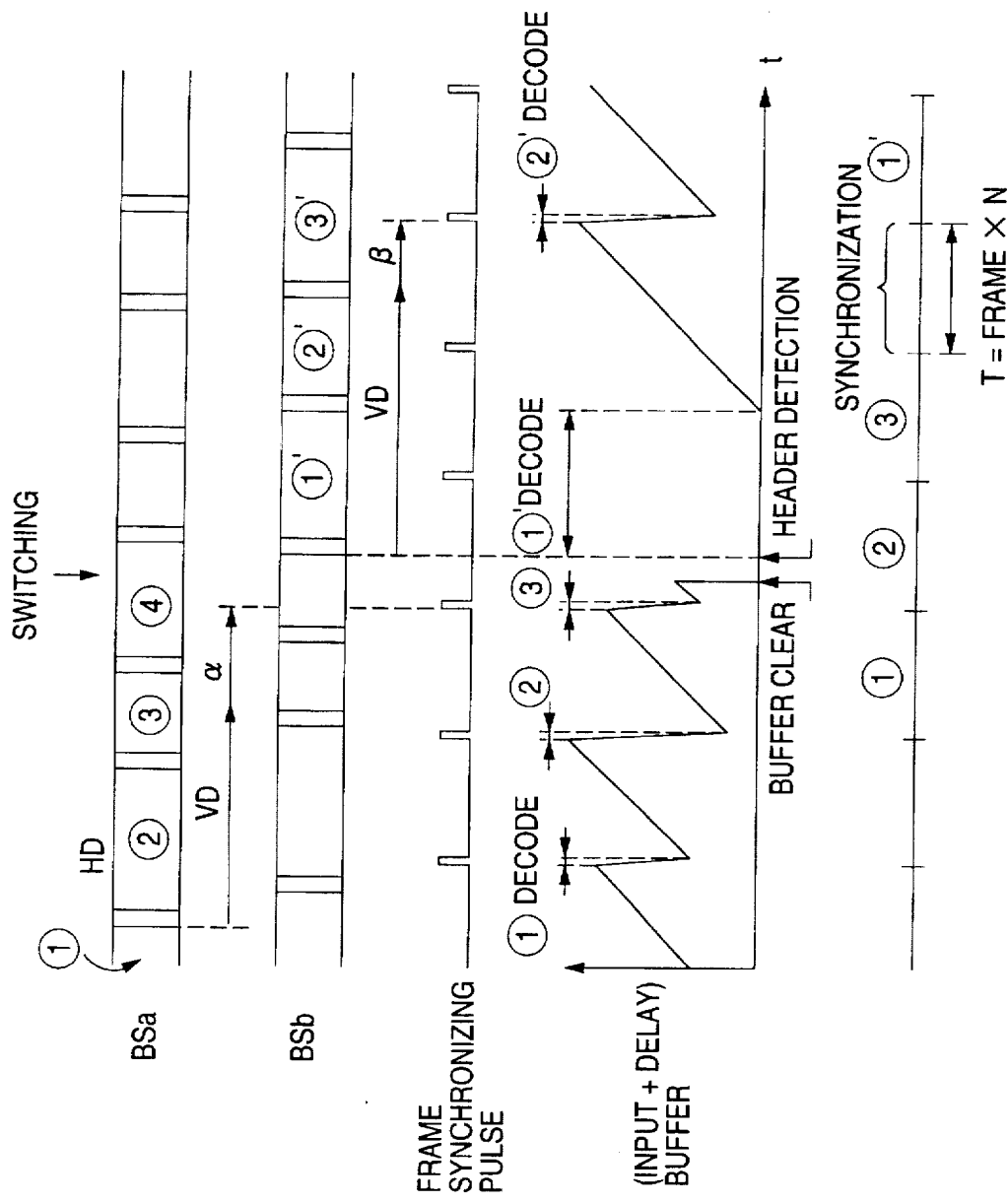
FIG. 2 is a diagram showing bit streams input timing, and display timing, and data stored in buffers in the image decoder.

FIG. 2 is a diagram showing the input timing and display timing of the bit streams BSa and BSb, and the amounts of data stored in the input buffer 21 and the delay buffer 22.

In the system, a bit stream corresponding in time to one frame is stored in the input buffer, while a bit stream corresponding in time to one frame in maximum is stored in the delay buffer 22. Considering now the picture (1), with the timing which is prior to the picture (1) decode timing, the picture (2) is stored in the input buffer 21 and the delay buffer 22. The picture (2) is decoded with the timing that, after it has been stored in the above-described manner, the next frame synchronizing pulse is inputted. And in synchronization with the timing that the frame synchronizing pulse is inputted first after the passage of the VBV delay VD of the picture (2), the latter (2) is displayed. That is, the picture (2) is displayed at the lapse of (VD+α) after the detection of the picture starter code PSC. The display timing is delayed by +α and, therefore, the input bit stream BSa is stored as much; that is, it is stored in the delay buffer 22. The data +α never exceeds one frame. This means that the capacity of the delay buffer 22 corresponds to at least one frame.

In the case where the input bit stream BSa is switched over to the input bit stream BSb while the picture (1) is being inputted, the input buffer 21 and the delay buffer 22 are cleared. At this time instant, the decoding of up to the picture (3) has been accomplished. Hence, display of up to the picture 3 is carried out. When, after clearing the buffers 21 and 22, the picture start code PSC of the picture (1') is detected, then the buffers 21 and 22 are firstly placed in through-state, and the decoding of the picture (1') is started without delay. The picture (1') is displayed with the timing that the frame synchronizing pulse is first inputted after the passage of VD. That is, the picture (1') is displayed at the passage of (VD+α) after the detection of PSC. On the other hand, parts of the pictures (2') and (3') are stored in the buffers 21 and 22. The data β never exceeds one frame.

As described above, with the system of the invention, the image frame is displayed in synchronization with the frame synchronizing pulse after the passage of VD, and therefore different bit streams can be individually synchronized. Hence, the system is free from the difficulty that the image is made irregular at the channel switching operation.

Figure 3:
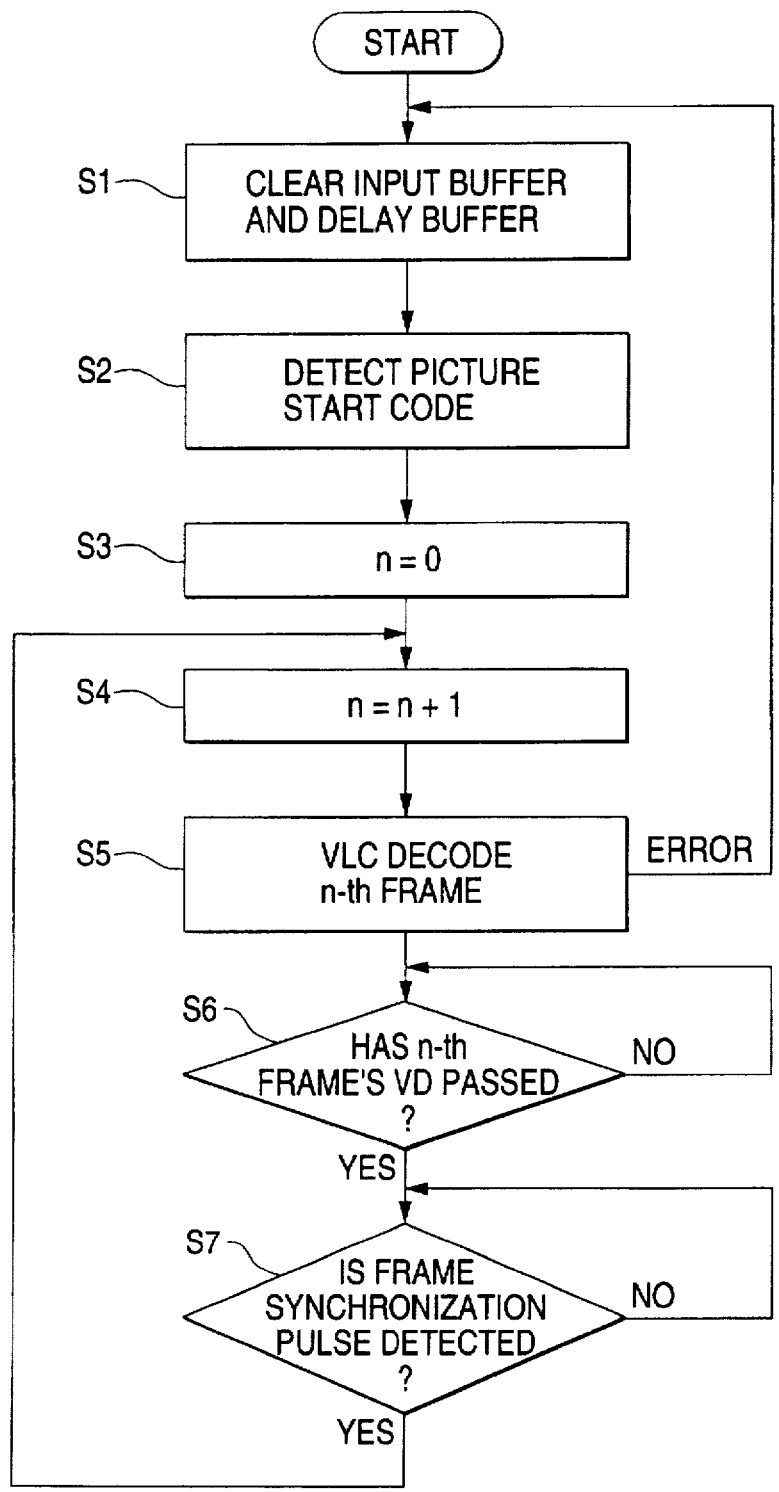
FIG. 3 is a flow chart for a description of the operation of a VLC decoding section in the image decoder.
Figure 4:
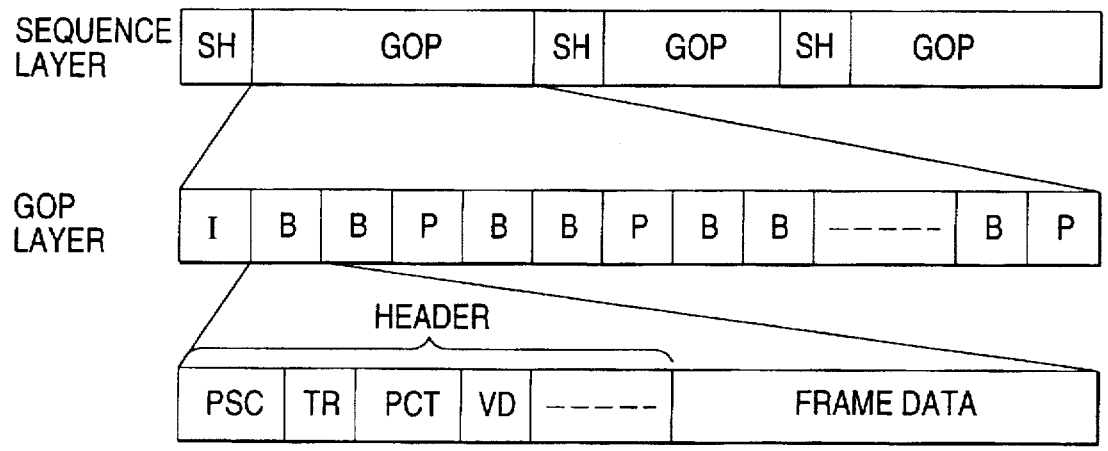
FIG. 4 is a diagram for a description of the structure of data of MPEG.
Figure 5:
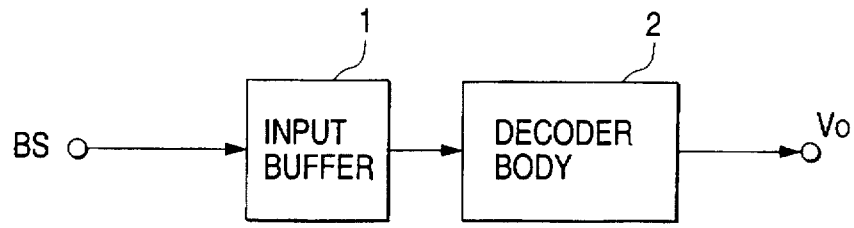
FIG. 5 is a diagram showing the arrangement of a conventional image decoder.
Figure 7:
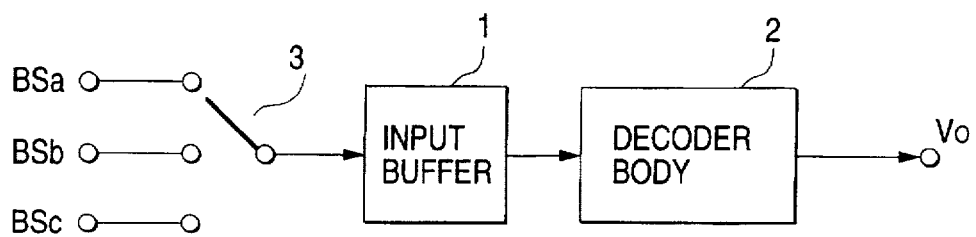
FIG. 7 is a block diagram showing a conventional image decoder which receives a plurality of channels of bit streams through switching means.
Figure 6:
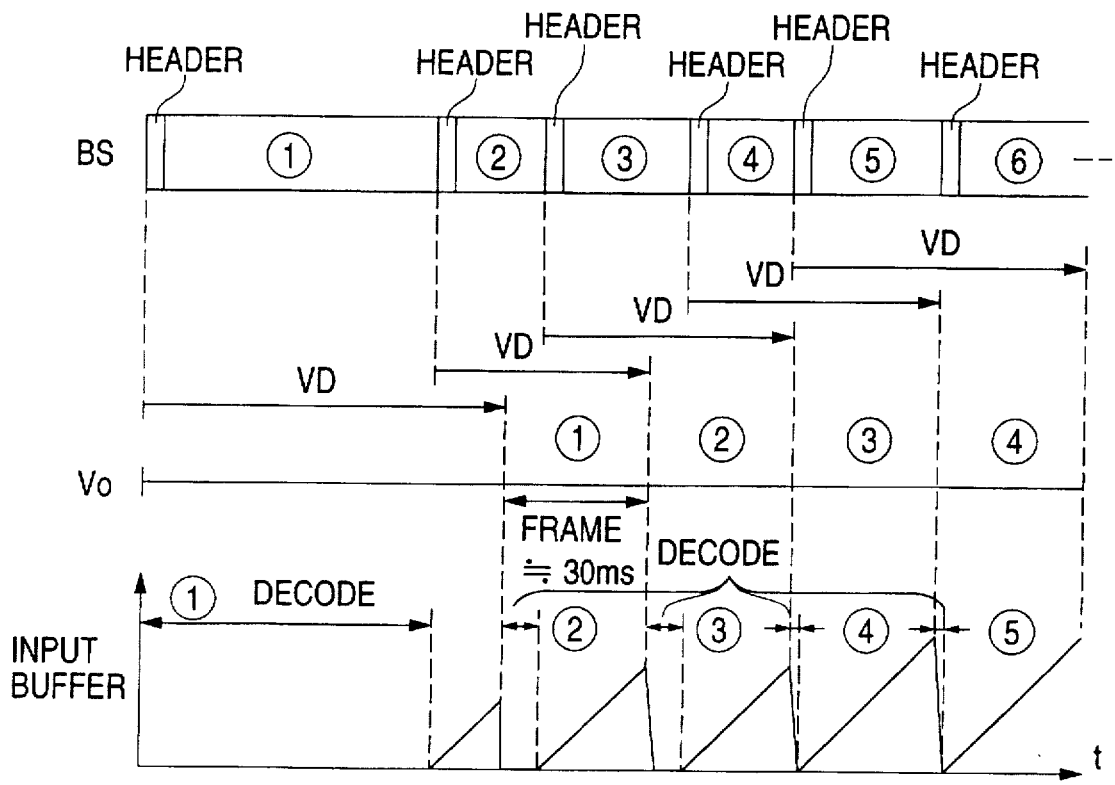
FIG. 6 is a diagram showing bit stream input timing and display timing, and data stored in buffers in the conventional image decoder.
Figure 8:
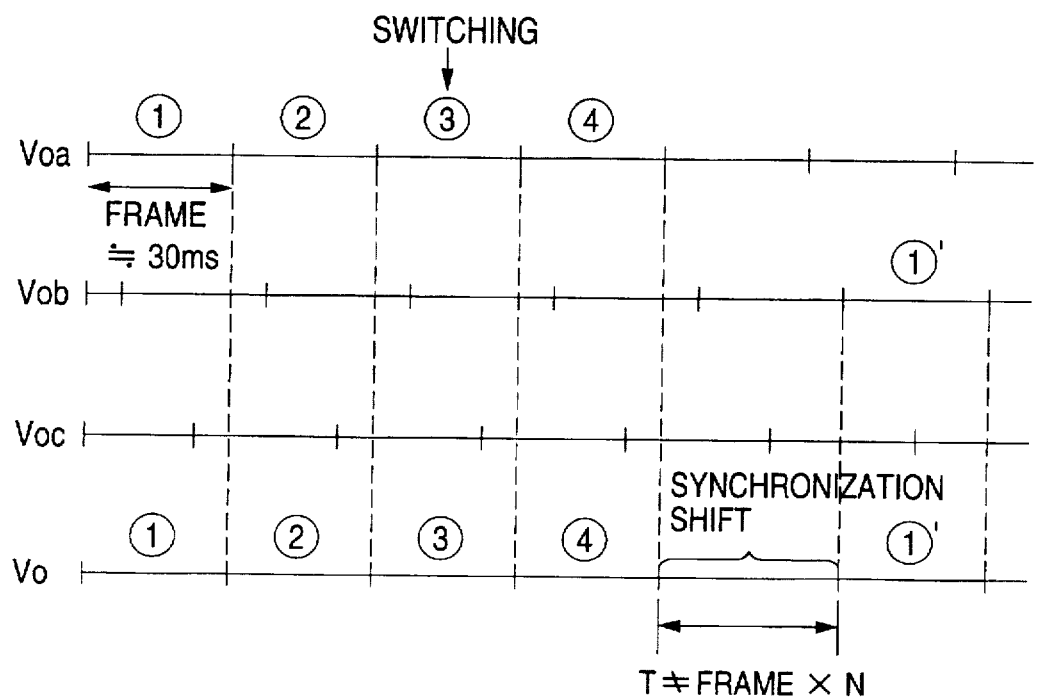
FIG. 8 is a diagram for a description of problems which are involved when plural channels of bit streams are switched over to one another.

FIG. 3 is a flow chart for showing the operation of a VLD decoder (not shown) in the decoder body which achieves the above-described various operations.

As shown in FIG. 3, first the input buffer 21 and the delay buffer 22 are cleared (Step S1). Upon detection of the PSC (picture start code) (Step S2), beginning with the first frame the frames are subjected to VLC decoding (Steps S3, S4 and S5). After the VLC decoding operation, the system waits for the passage of the VD of that frame (Step S6). After the passage of the VD, the system waits for the detection of the frame synchronizing pulse (Step S7). Upon detection of the frame synchronizing pulse, the next frame stored in the buffers 21 and 22 is subjected to VLC decoding (Steps S4 and S5).

During the VLC decoding operation, if an error occurs for instance by the channel switching operation, Step S1 is effected again to thereby clear the buffers 21 and 22 (Step S1).

The above-described steps are repeatedly carried out, so that the channel switching operation can be realized not suffering from the asynchronous trouble.

In the above-described embodiment, the frame synchronizing pulses are externally supplied independently of the bit streams BSa, BSb and BSc. However, the frame synchronizing pulses may be supplied in synchronization with one of the bit steams BSa, BSb and BSc. In this case, the modification should be made as follows. The CPU 13 detects the display timing based on the VD of the bit stream which is first inputted, and, a is added to the VD of the bit stream after switched, according to the display timing of the bit stream before switched.

In the above-described embodiment, for simplification in description, each picture display timing occurs one frame after the decoding timing. However, in practice, the picture display timing may occur several frames after the decoding timing as the case may be.

In the case of MPEG, it is impossible for the P or B picture to form an image by itself. Hence, it is preferable to start the decoding operation at the time instant that the I picture is detected for the first time after the channel switching operation.

As described above, the buffers 21 and 22 are cleared with respect to the detection of the VLC decoding error. However, in the case where the CPU 13 has the switching timing, the system may be so designed that the CPU 13 applies buffer clearing timing to the decoder body 11.

As was described above, in synchronization with the frame synchronizing pulse which occurs for the first time after the passage of a delay period set for every frame in each of the bit streams, that frame is displayed; while the input bit streams coming in during the period of time which elapses from the passage of the delay period until the occurrence of the frame synchronizing pulse, are absorbed by the delay buffer. Hence, even when plural channels of bit streams different in display timing are switched over to one another, the display timing of each frame is synchronous with the aforementioned frame synchronizing pulse. Thus, the image decoder is free from the above-described difficulty accompanying the conventional image decoder which is due to the asynchronous problem.

While preferred embodiments of the invention have been described, it will be obvious to those skilled in the art that various changes and modifications may be made thereto without departing from the invention, and it is aimed, therefore, to cover in the appended claim all such changes and modifications as fall within the true spirit and scope of the invention.

What is claimed is:

1. An image decoder comprising:
   a decoding device for decoding a variable-length frame input bit stream including image data, said decoding device determining timing of display of image data decoded in accordance with a predetermined frame synchronizing pulse signal after the passage of a delay time set for said input bit stream for each frame;
   an input buffer component disposed in input side of said decoding device for adjusting the timing of supplying said input bit stream to said decoding device; and
   a delay buffer component disposed between said decoding device and said input buffer component for storing an input bit stream which corresponds in time to at least one frame.

2. The image decoder of claim 1, further comprising a frame synchronizing pulse signal generation device connected to said decoding device.

3. The image decoder of claim 1, wherein said frame synchronizing pulse signals are supplied in synchronization with one of the bit streams.

4. The image decoder of claim 1, wherein said picture display timing occurs one frame after the decoding timing.

5. The image decoder of claim 1, wherein said picture display timing may occur several frames after the decoding timing.

6. The image decoder of claim 1, wherein said input buffer component and said delay buffer component are composed in a single memory.

7. The image decoder of claim 6, wherein said memory is constituted by a DRAM.

8. The image decoder of claim 6, wherein said memory comprises a main memory block and a frame memory block.

9. The image decoder of claim 1, further comprising a switch for changing the input bit stream.

10. The image decoder of claim 9, further comprising a central control unit coupled between said switch and said decoding device.

11. A method of decoding a variable-length frame input bit stream including image data, said method comprising:
   inputting an input bit stream;
   clearing an input buffer and a delay buffer;
   detecting a picture start code included in the input bit stream;
   placing the input buffer and the delay buffer in through-state;
   starting a decode of the image data without delay; and
   displaying a picture represented by the image data in accordance with a frame synchronizing pulse which is first inputted after the passage of VBV delay.

12. A method of decoding a variable-length frame input bit stream including image data, said method comprising:
   clearing an input buffer and a delay buffer;
   detecting a picture start code;
   VLC decoding image data beginning with a first frame;
   detecting a frame synchronizing pulse after the passage of the VBV delay; and
   VLC decoding the next frame stored in the input and delay buffers.

13. The image decoder as defined in claim 1,
   wherein said image decoder receives a plurality of input bit streams, and
   the frame synchronizing pulse signal is used in determining timing of display of image data for all of the input bit streams.

14. The image decoder as defined in claim 1,
   wherein said image decoder is selectively connected to at least two input bit streams, and
   the frame synchronizing pulse signal is generated without regard to which of the input bit streams is presently selected for decoding by the decoding device.

15. The image decoder as defined in claim 1,
   wherein the decoding device decodes one of a plurality of input bit streams, and
   the frame synchronizing pulse signal is supplied at identical timings regardless of which one of the input bit streams is being decoded by the decoding device.

* * * * *